(12) United States Patent
Gustof et al.

(10) Patent No.: US 12,437,530 B2
(45) Date of Patent: Oct. 7, 2025

(54) METHOD, SYSTEM AND COMPUTER PROGRAM PRODUCT FOR CORRELATING OBJECTS OF INTEREST BASED ON DIFFERENCE AND SIMILARITIES ANALYSIS

(71) Applicant: MOTOROLA SOLUTIONS, INC., Chicago, IL (US)

(72) Inventors: Grzegorz Gustof, Myslenice (PL); Pawel Niemiec, Rzeszow (PL); Pawel Wilkosz, Wisniowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 314 days.

(21) Appl. No.: 18/040,735

(22) PCT Filed: Nov. 10, 2020

(86) PCT No.: PCT/PL2020/050082
§ 371 (c)(1),
(2) Date: Feb. 6, 2023

(87) PCT Pub. No.: WO2022/103286
PCT Pub. Date: May 19, 2022

(65) Prior Publication Data
US 2023/0281984 A1    Sep. 7, 2023

(51) Int. Cl.
*G06V 10/94*        (2022.01)
*G06F 3/01*         (2006.01)
(Continued)

(52) U.S. Cl.
CPC ............ *G06V 10/945* (2022.01); *G06F 3/013* (2013.01); *G06V 10/761* (2022.01); *G06V 20/52* (2022.01); *G06V 20/40* (2022.01)

(58) Field of Classification Search
CPC .... G06V 20/52; G06V 10/945; G06V 10/761; G06V 20/40; H04N 7/181; G06T 2207/30232; G06F 3/013
(Continued)

(56) References Cited

U.S. PATENT DOCUMENTS 9,202,117 B2   12/2015 Kundu et al.
9,317,113 B1   4/2016 Karakotsios et al.
(Continued)

FOREIGN PATENT DOCUMENTS

EP        3015952 B1   10/2019

OTHER PUBLICATIONS

H. R. Tavakoli, A. Borji, R. M. Anwer, E. Rahtu and J. Kannala, "Bottom-Up Attention Guidance for Recurrent Image Recognition," 2018 25th IEEE International Conference on Image Processing (ICIP), Athens, Greece, 2018, pp. 3004-3008, doi: 10.1109/ICIP. 2018.8451537.
(Continued)

*Primary Examiner* — Kathleen Y Dulaney

(57) ABSTRACT

A method, system and computer program product for correlating objects of interest based on difference and similarities analysis is disclosed. The method includes receiving input that a human user is focused on a portion of a first image during a first period of time, and also focused on a portion of a second image during a second period of time. In response to the input being received, a first analytics-based action may be initiated when certain similarity/difference conditions are met, or a second analytics-based action may be initiated when certain other similarity/difference conditions are met.

16 Claims, 3 Drawing Sheets

(51) Int. Cl.
*G06V 10/74* (2022.01)
*G06V 20/40* (2022.01)
*G06V 20/52* (2022.01)

(58) Field of Classification Search
USPC .................... 382/209, 103, 117, 128; 345/8; 351/209; 348/78
See application file for complete search history.

(56) References Cited

U.S. PATENT DOCUMENTS

| | | | | |
|---|---|---|---|---|
| 9,571,797 | B2* | 2/2017 | Kanehira | G06V 20/52 |
| 10,528,794 | B2 | 1/2020 | Koskan et al. | |
| 2006/0056733 | A1* | 3/2006 | Minakuti | H04N 5/765 |
| | | | | 348/231.2 |
| 2012/0243796 | A1* | 9/2012 | Saito | G06T 5/80 |
| | | | | 382/218 |
| 2012/0274777 | A1* | 11/2012 | Saptharishi | H04N 23/66 |
| | | | | 382/103 |
| 2016/0086342 | A1* | 3/2016 | Yamaji | G06T 11/60 |
| | | | | 382/103 |
| 2017/0109601 | A1 | 4/2017 | Gurwicz et al. | |
| 2017/0318019 | A1* | 11/2017 | Gordon | G06V 40/67 |
| 2018/0189600 | A1* | 7/2018 | Astrom | G06T 7/292 |
| 2019/0180456 | A1* | 6/2019 | Razumkov | G06T 7/00 |
| 2020/0074210 | A1* | 3/2020 | Beach | G06V 20/52 |
| 2021/0125639 | A1* | 4/2021 | Cai | G06V 40/10 |

OTHER PUBLICATIONS

X. Xu, T. M. Hospedales and S. Gong, "Discovery of Shared Semantic Spaces for Multiscene Video Query and Summarization," in IEEE Transactions on Circuits and Systems for Video Technology, vol. 27, No. 6, pp. 1353-1367, Jun. 2017, doi: 10.1109/TCSVT.2016.2532719.

P. Napoletano, G. Boccignone and F. Tisato, "Attentive Monitoring of Multiple Video Streams Driven by a Bayesian Foraging Strategy," in IEEE Transactions on Image Processing, vol. 24, No. 11, pp. 3266-3281, Nov. 2015, doi: 10.1109/TIP.2015.2431438.

The International Search Report and the Written Opinion corresponding patent application No. PCT/PL2020/050082 filed: Nov. 10, 2020, all pages.

* cited by examiner

METHOD, SYSTEM AND COMPUTER PROGRAM PRODUCT FOR CORRELATING OBJECTS OF INTEREST BASED ON DIFFERENCE AND SIMILARITIES ANALYSIS

CROSS-REFERENCE TO RELATED APPLICATIONS

This is the U.S. National Stage of International Application No. PCT/PL20/50082 filed Nov. 10, 2020, the entire contents of which are incorporated herein by reference in its entirety.

BACKGROUND

Automated security and surveillance systems typically employ video cameras or other image capturing devices or sensors to collect image data such as video or video footage. In the simplest systems, images represented by the image data are displayed for contemporaneous screening by security personnel and/or recorded for later review after a security breach or other incident. In those systems, the task of detecting and classifying visual objects of interest is performed by a human observer. A significant advance occurs when the system itself is able to perform object detection and classification, either partly or completely. Indeed, computer-implemented analysis of video to detect and recognize objects and which objects are similar and different is becoming increasingly important.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
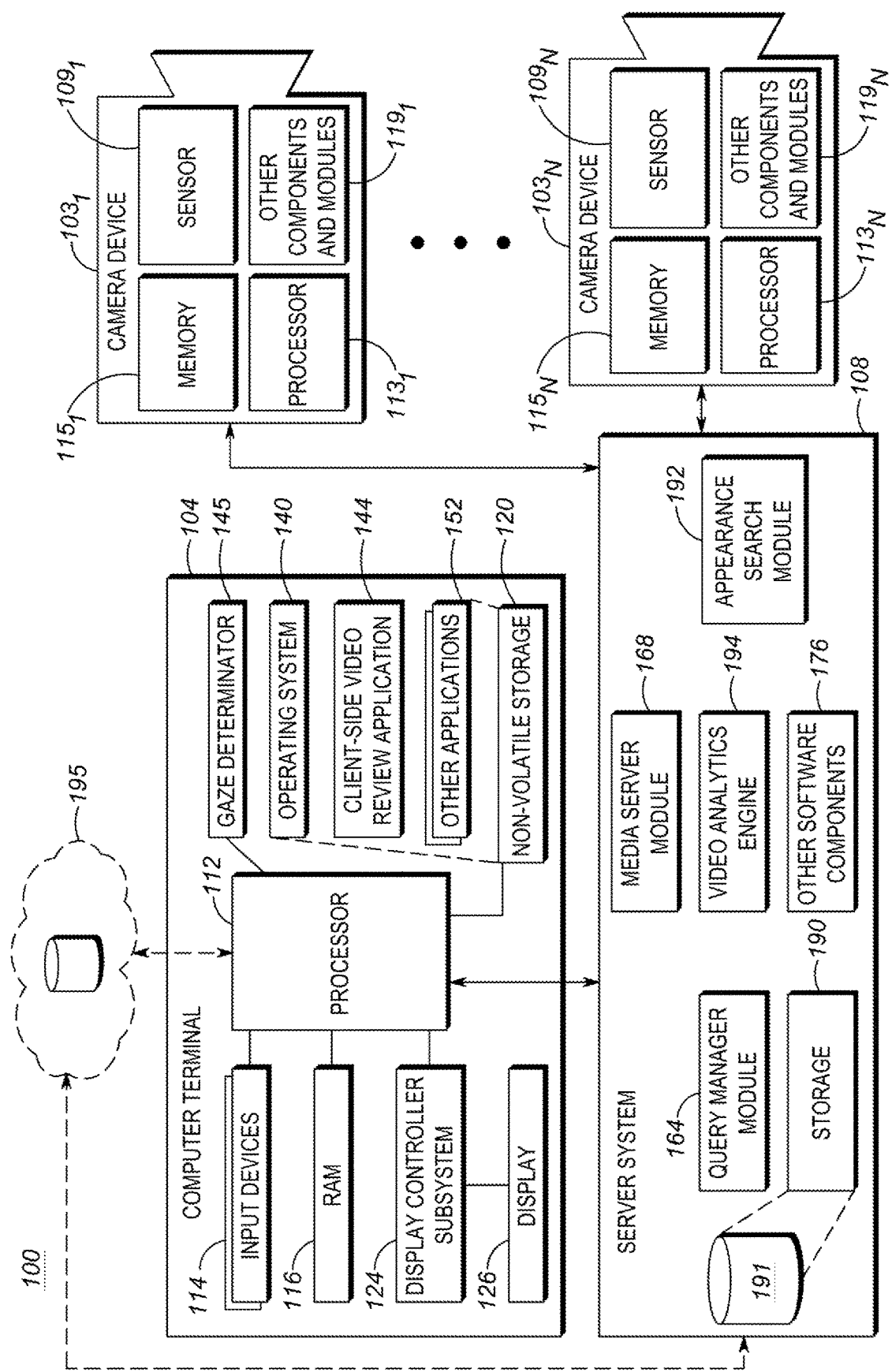
FIG. 1 is a block diagram of a security system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes storing first and second images within at least one storage. The method also includes displaying the first image during a first period of time, and displaying the second image during a second period of time. The method also includes receiving input that a human user is focused on a portion of the first image during the first period of time, and also focused on a portion of the second image during the second period of time. The method also includes determining a first similarity score between a first object of interest in the portion of the first image and a second object of interest in the portion of the second image. The method also includes determining a second similarity score between a first background portion of the first image and a second background portion of the second image. The method also includes initiating, in response to the input being received: i) a first analytics-based action when the first similarity score exceeds a first upper threshold and the second similarity score falls below a second lower threshold; or ii) initiating a second analytics-based action when the first similarity score falls below a first lower threshold and the second similarity score exceeds a second upper threshold.

In accordance with another example embodiment, there is provided a system that includes at least one display apparatus configured to: i) display a first image during a first period of time; and ii) display a second image during a second period of time. The system also includes at least one storage configured to store the first and second images. The system also includes at least one processor in communication with the storage and the display apparatus. The at least one processor is configured to receive input that a human user of the system is focused on: i) a portion of the first image during the first period of time; and ii) a portion of the second image during the second period of time. The at least one processor is also configured to determine a first similarity score between a first object of interest in the portion of the first image and a second object of interest in the portion of the second image. The at least one processor is also configured to determine a second similarity score between a first background portion of the first image and a second background portion of the second image. In response to the input being received, the at least one processor is also configured to: i) initiate a first analytics-based action when the first similarity score exceeds a first upper threshold and the second similarity score falls below a second lower threshold; or ii) initiate a second analytics-based action when the first similarity score falls below a first lower threshold and the second similarity score exceeds a second upper threshold.

Each of the above-mentioned embodiments will be discussed in more detail below, starting with example system and device architectures of the system in which the embodiments may be practiced, followed by an illustration of processing blocks for achieving an improved technical method, device, and system for correlating objects of interest based on difference and similarities analysis.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a Software as a Service (SaaS), Platform as a Service (PaaS), or Infrastructure as a Service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, other entities, etc.

Further advantages and features consistent with this disclosure will be set forth in the following detailed description, with reference to the figures.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126. In some examples, the computer terminal 104 may include more than one display screen 126 (it is contemplated that the computer terminal 104 may include any suitable number of display screens).

The computer terminal 104 includes a gaze determinator 145. The gaze determinator 145 is any suitable known device configured to analyze and determine a direction and location of a system user's gaze, and also configured to output focus information to the computer terminal 104. An example of the gaze determinator 145 is disclosed in U.S. Pat. No. 9,317,113 entitled "Gaze Assisted Object Recognition". In at least one example the gaze determination device is a wearable device that is configured to be worn on a head or face of the human user, and is positionable to rest proximate to an eye region of the human user.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Regarding the client-side video review application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video data (and respective metadata) in support of, for example, client-side video review, video export, managing event detection, etc. In this regard, the query manager module 164 is communicatively coupled to one or more data stores 190 (described later herein in more detail) and an appearance search module 192 that supports appearance searches.

Still with reference to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_n$ in the security system 100. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Also, those skilled in the art will appreciate that, in some instances, the video analytics engine may be programmed with a detection classifier that evaluates a received video stream (for example, an image or part of an image of the video stream captured by one of camera devices $103_1$-$103_n$ which are described in more detail later herein) to determine if an instance of an object of interest that is defined in the detection classifier is detected or not from the evaluated video stream.

The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, non-video sensor data, still images, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc.

Optionally, the security system 100 may include connections to one or more cloud services 195. For example, the computer terminal 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). As will be appreciated by those skilled in the art, part of the functionalities herein described as being provided by the server system 108 may optionally be instead fully or partly provided by the cloud service(s) 195. In some examples, one or more storages are provided at the cloud service location to store video and/or still images employed within the security system 100.

The illustrated security system 100 includes the plurality of camera devices $103_1$-$103_n$ (hereinafter interchangeably referred to as "cameras $103_1$-$103_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

The camera 103 includes an image sensor 109 (corresponding to one of the sensors $109_1$-$109_N$ shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113 (corresponding to one of the processors $113_1$-$113_N$ shown in FIG. 1), other components and modules 119 (corresponding to one of drawing elements $119_1$-$119_N$ shown in FIG. 1), and one or more memory devices 115 (corresponding to one of the memories $115_1$-$115_N$ shown in FIG. 1) coupled to the processors and one or more network interfaces. Regarding the other components and modules 119, just one example amongst various others would be a video analytics module. A video analytics module within the camera 103 may generate metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system 100 illustrated in FIG. 1 only explicitly shows camera devices coupled to the server system 108, it will be understood that the security system 100 is not limited in contemplated compositions to just camera devices. Some examples of the security system 100 include a heterogeneous mixture of both camera devices and other sensor devices coupled to the server system 108. One type of alternative sensor device is a radar-based sensor device such as, for example, the Avigilon Presence Detector (APD)™ sold by Avigilon Corporation.

Figure 2:
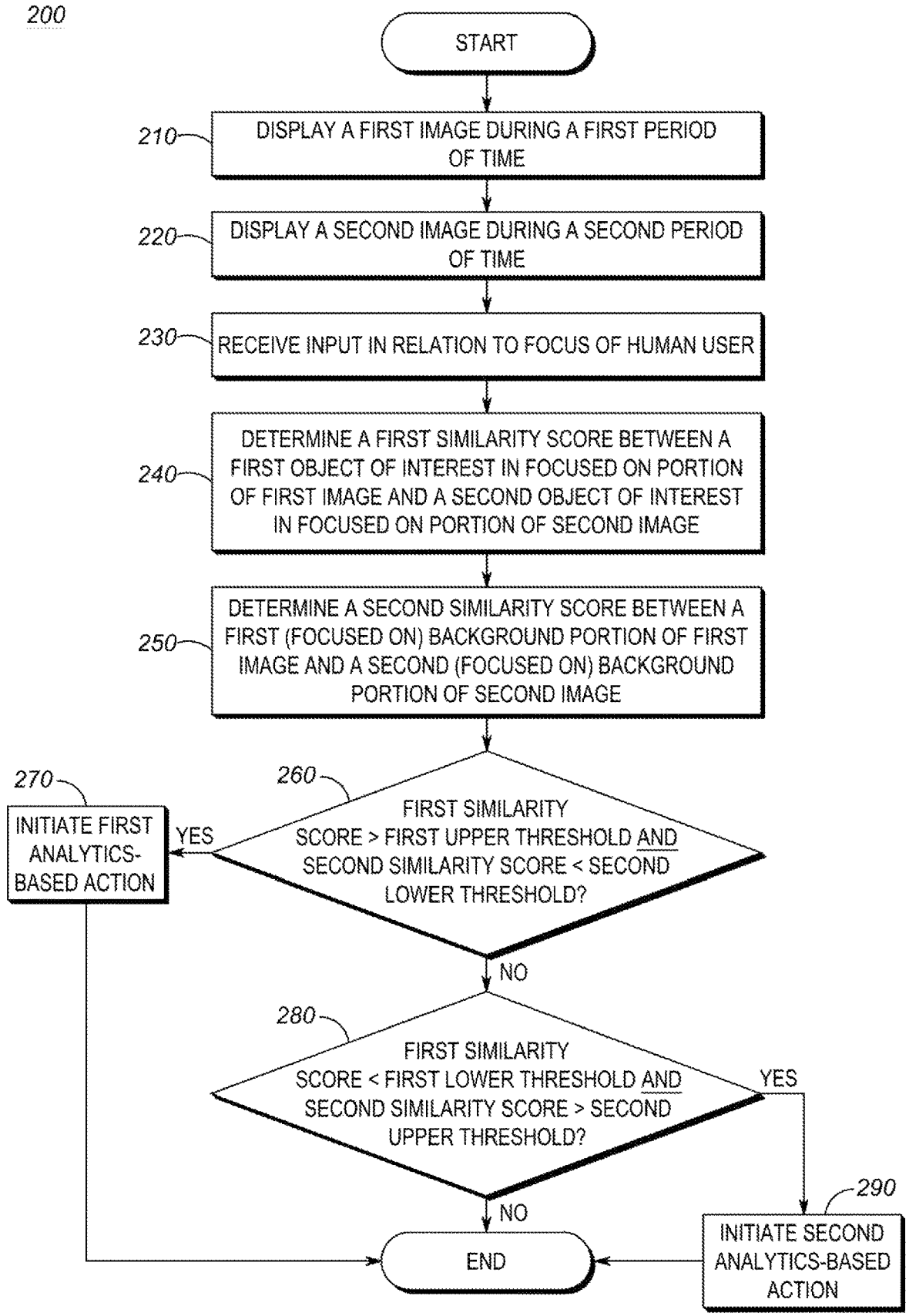
FIG. 2 is a flow chart of a method for correlating objects of interest within a focus of a security system user, that changes between images, in accordance with an example embodiment.
Figure 3:
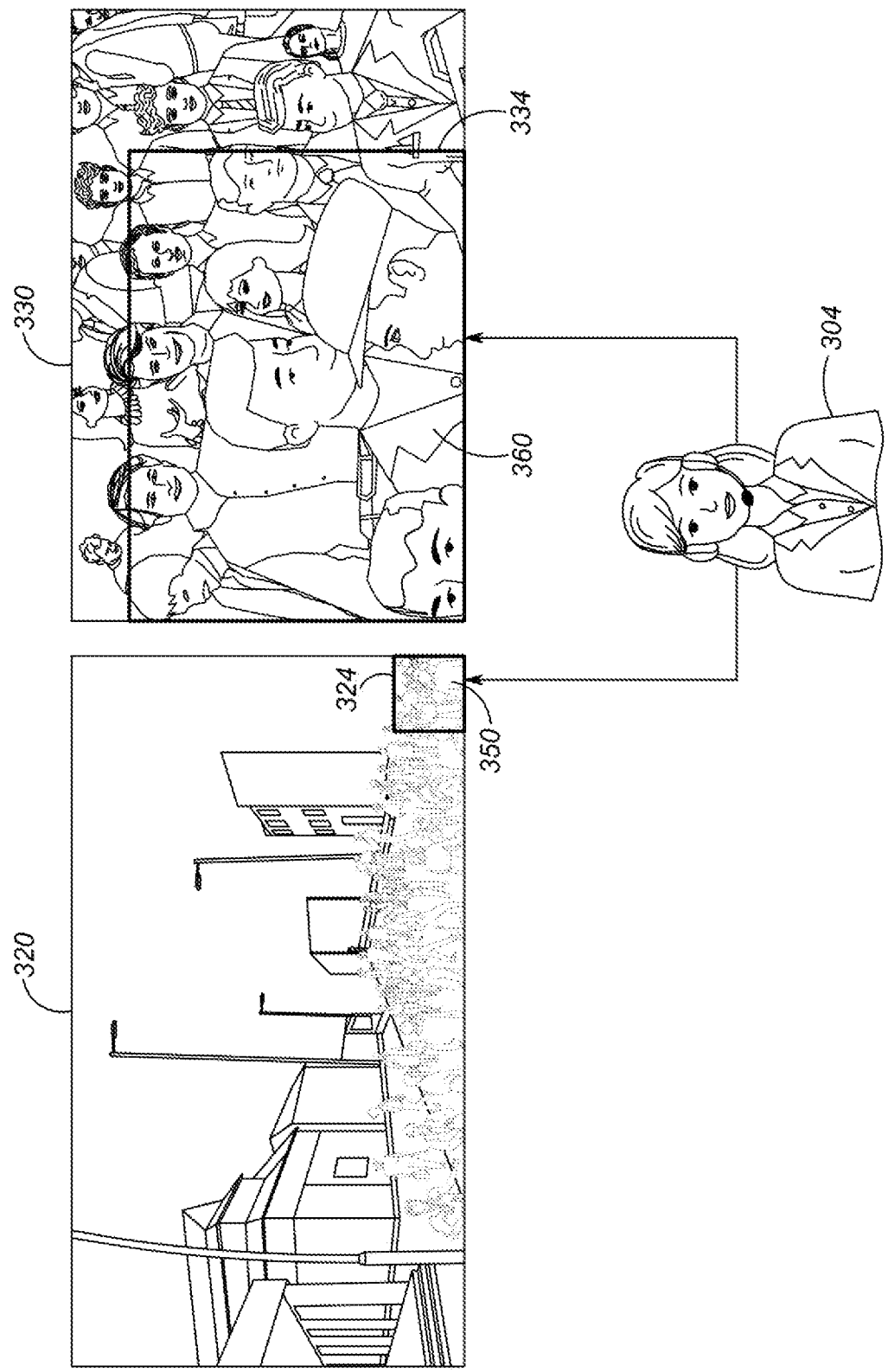
FIG. 3 is a diagram showing two images focused on, by a security system user, during respective periods of time, in accordance with an example embodiment.

Reference is now made to FIGS. 2 and 3. FIG. 2 is a flow chart of a method 200 for correlating objects of interest within a security system user's focus (for example, focus of security system user 304 shown in FIG. 3) that changes between images, in accordance with an example embodiment.

First in the method 200, a first image (for example, image 320) is displayed (210) during a first period of time. Within the image 320, a portion 324 is focused on by the security system user 304 during the first period of time.

Next in the method 200, a second image (for example, image 330) is displayed (220) during a second period of time. Within the image 330, a portion 334 is focused on by the security system user 304 during the second period of time.

In the illustrated example embodiment, an end of the first period of time and a beginning of the second period in time differ by less than a contemporaneity threshold required for input (i.e. human focus information in relation to the first and second images as described below) to be received.

Next in the method 200, input is received (230) in relation to focus of the security system user 304. For example, the gaze determinator 145 (FIG. 1) may send focus information to the client-side video review application 144. The focus information may include, for example, the coordinates identifying location of the portions 324 and 334 with the images 320 and 330 respectively, and also start and duration times for the first and second time periods mentioned above.

Next in the method 200, a first similarity score is determined (240) as between a first object of interest in the focused on portion in the first image and a second object of interest in the focused on portion in the second image (for example, a similarity score as between object 350 within the portion 324 and object 360 within the portion 334).

Next in the method 200, a second similarity score is determined (250) as between a first (focused on) background portion of the first image and a second (focused on) background portion of the second image (for example, a similarity score as between a non-foreground part of the portion 324 and a non-foreground part of the portion 334).

In at least some examples, the first and second similarity scores are each some percentage number within a range from 0% to 100%. The percentage number is variable, and thus in any particular iteration of the method 200 each of the first and second similarity scores may assume any value in that range that it has been appropriately calculated to be.

Next in the method 200, decision action 260 follows the action 250. In particular, a determination is made as to whether both: i) the first similarity score exceeds some first upper threshold; and ii) the second similarity score is lower than some second lower threshold. If yes, action 270 follows, and a first analytics-based action is initiated. For example, the first analytics-based action may be providing a notification to the human user that includes similarity particulars in relation to the first and second objects of interest. These similarity particulars may be provided to the human user with or without additional difference details (for instance, where the difference relates to one specific article of clothing it is possible that pointing that out may resolve doubt in the human user as to the relationship between the first and second objects of interest. Furthermore, it is also contemplated that the first analytics-based action may be a plurality of actions. For example, in addition to providing the aforementioned notification to the human user of similarity particulars, it is also contemplated that the human user may be provided with other details retrieved via search(es) (which may include details not visible in the displayed images) such as, for instance, when the first and second objects of interest are matched to one person, records for that person (for example, one or more convictions for that person, one or more outstanding warrants for that person, dates of one or more recent government-controlled purchases for that person, et cetera), or when the first and second objects of interest are matched to one vehicle, records for that vehicle (for example, a license plate number for that vehicle, a vehicle identification number for that vehicle, one or more reported accidents involving that vehicle, et cetera).

Continuing on, decision action 280 follows the no branch of the decision action 260. For the decision action 280, a determination is made as to whether both: i) the first similarity score is lower than some first lower threshold; and ii) the second similarity score is greater than some second upper threshold. If yes, action 290 follows, and a second analytics-based action is initiated (for example, the second analytics-based action may be providing a notification to the human user that includes difference particulars in relation to the first and second objects of interest). These difference particulars may be provided to the human user with or without additional similarity details (for example, informing the human user that both images appear to involve an organized protest in front of a same building might provide a mental cue to the human user). Furthermore, it is also contemplated that the second analytics-based action may be a plurality of actions. For example, in addition to providing the aforementioned notification to the human user of difference particulars, it is also contemplated that the human user may be provided with other details retrieved via search(es) (which may include details not visible in the displayed images) such as, for instance, when the first and second objects of interest are matched to a first person and a second person respectively, records for those two people (for example, one or more common group affiliations, a common date of one or more recent government-controlled purchases by both people, et cetera), or when the first and second objects of interest are matched to a first vehicle and a second vehicle respectively, records for those two vehicles (for example, both license plates being from the same state or province, both vehicles having been in a same reported accident, et cetera).

Continuing on, if the no branch is taken from the decision action 280, the method 200 ends.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot create similarity score rules to conditionally trigger certain analytics based actions, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

While some example embodiments described in expanded detail herein explicitly mention capture, storage, retrieval and/or processing of video without the same extensive explicitly mentioning of the capture, storage, retrieval and/or processing of still images, the latter is also contemplated as appropriate.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   storing first and second images within at least one storage;
   displaying the first image during a first period of time;
   displaying the second image during a second period of time;
   receiving input that a human user is focused on:
      a portion of the first image during the first period of time, and
      a portion of the second image during the second period of time;
   determining a first similarity score between a first object of interest in the portion of the first image and a second object of interest in the portion of the second image;
   determining a second similarity score between a first background portion of the first image and a second background portion of the second image;
   in response to the input being received:
      initiating a first analytics-based action when the first similarity score exceeds a first upper threshold and the second similarity score falls below a second lower threshold; or
      initiating a second analytics-based action when the first similarity score falls below a first lower threshold and the second similarity score exceeds a second upper threshold; and
   employing a gaze determination device to determine that the human user is focused on the portion of the first image during the first period of time, and the portion of the second image during the second period of time,
   wherein the gaze determination device is configured to be worn on a head or face of the human user, and is positionable to rest proximate to an eye region of the human user.

2. The method of claim 1 wherein at least one of the portion of the first image and the portion of the second image are less than an entirety of the first image.

3. The method of claim 1 wherein the first period of time and the second period of time at least partly overlap.

4. The method of claim 1 wherein an end of the first period of time and a beginning of the second period in time differ by less than a contemporaneity threshold required for the input to be received.

5. The method of claim 1 wherein the first similarity score falls within a percentage range, the percentage range having a lower percentage bound above 50% and an upper percentage bound below 100%.

6. The method of claim 1 wherein the first similarity score falls within a percentage range, the percentage range having a lower percentage bound above 0% and an upper percentage bound below 50%.

7. The method of claim 1 wherein the at least one storage includes cloud storage at a location remote from the human user.

8. The method of claim 1 wherein the first analytics-based action is providing a notification to the human user that includes similarity particulars in relation to the first and second objects of interest.

9. The method of claim 1 wherein the second analytics-based action is providing a notification to the human user that includes difference particulars in relation to the first and second objects of interest.

10. A system comprising:
at least one display apparatus configured to:
  display a first image during a first period of time; and
  display a second image during a second period of time;
at least one storage configured to store the first and second images;
at least one processor in communication with the storage and the display apparatus, the at least one processor configured to:
  receive input that a human user of the system is focused on:
    a portion of the first image during the first period of time, and
    a portion of the second image during the second period of time;
  determining a first similarity score between a first object of interest in the portion of the first image and a second object of interest in the portion of the second image;
  determining a second similarity score between a first background portion of the first image and a second background portion of the second image; and
  in response to the input being received:
    initiate a first analytics-based action when the first similarity score exceeds a first upper threshold and the second similarity score falls below a second lower threshold; or
    initiate a second analytics-based action when the first similarity score falls below a first lower threshold and the second similarity score exceeds a second upper threshold; and
a gaze determination device configured to determine that the human user is focused on the portion of the first image during the first period of time, and the portion of the second image during the second period of time,
wherein the gaze determination device is configured to be worn on a head or face of the human user, and is positionable to rest proximate to an eye region of the human user.

11. The system as claimed in claim 10 wherein the at least one storage includes cloud storage at a location remote from the human user.

12. The system as claimed in claim 10 wherein the first analytics-based action is providing a notification to the human user that includes similarity particulars in relation to the first and second objects of interest.

13. The system as claimed in claim 10 wherein the second analytics-based action is providing a notification to the human user that includes difference particulars in relation to the first and second objects of interest.

14. The system as claimed in claim 10 wherein at least one of the portion of the first image and the portion of the second image are less than an entirety of the first image.

15. The system as claimed in claim 10 wherein the first period of time and the second period of time at least partly overlap.

16. The system as claimed in claim 10 wherein an end of the first period of time and a beginning of the second period in time differ by less than a contemporaneity threshold required for the input to be received.

* * * * *